United States Patent
Oya

(10) Patent No.: US 10,095,458 B2
(45) Date of Patent: Oct. 9, 2018

(54) INFORMATION PROCESSING APPARATUS, INFORMATION PROCESSING METHOD, NON-TRANSITORY COMPUTER-READABLE STORAGE MEDIUM, AND SYSTEM

(71) Applicant: CANON KABUSHIKI KAISHA, Tokyo (JP)

(72) Inventor: Takashi Oya, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/166,307

(22) Filed: May 27, 2016

(65) Prior Publication Data
US 2016/0357491 A1 Dec. 8, 2016

(30) Foreign Application Priority Data

Jun. 2, 2015 (JP) ................. 2015-112403

(51) Int. Cl.
G09G 5/00 (2006.01)
G06F 3/14 (2006.01)
(Continued)

(52) U.S. Cl.
CPC ....... *G06F 3/1423* (2013.01); *G02B 27/0172* (2013.01); *G06F 3/012* (2013.01);
(Continued)

(58) Field of Classification Search
CPC ...... G06F 3/1423; G06F 3/0488; G06F 3/012; G06F 3/04815; G06F 3/14; G06F 3/01;
(Continued)

(56) References Cited

U.S. PATENT DOCUMENTS 7,532,224 B2 5/2009 Bannai
2006/0170652 A1 8/2006 Bannai et al.
(Continued)

FOREIGN PATENT DOCUMENTS

CN 104335155 A 2/2015
JP 2006293604 A 10/2006
WO 2014162852 A1 10/2014

OTHER PUBLICATIONS

Extended European Search Report issued in European Appln. No. 16001150.8, dated Oct. 21, 2016.
(Continued)

*Primary Examiner* — Xilin Guo
(74) *Attorney, Agent, or Firm* — Rossi, Kimms & McDowell LLP

(57) ABSTRACT

An image of a virtual object is generated in accordance with a position and orientation of a first display device. In a case where a first mode is set, the generated image of the virtual object is displayed on a first display device and second display device. In a case where a second mode different from the first mode is set, a still image of the virtual object is displayed on the second display device. A portion of the virtual object in the still image is selected based on an instruction input by a user observing the second display device during display of the still image of the virtual object. An image of the virtual object displayed on the second display device is updated based on the selected portion of the virtual object.

13 Claims, 12 Drawing Sheets

(51) Int. Cl.
*G06F 3/0488* (2013.01)
*G06F 3/01* (2006.01)
*G06F 3/0481* (2013.01)
*G06T 19/00* (2011.01)
*G02B 27/01* (2006.01)

(52) U.S. Cl.
CPC ........ *G06F 3/0488* (2013.01); *G06F 3/04815* (2013.01); *G06T 19/006* (2013.01); *G02B 2027/014* (2013.01); *G02B 2027/0138* (2013.01); *G02B 2027/0187* (2013.01); *G06T 2219/024* (2013.01)

(58) Field of Classification Search
CPC ............. G06F 3/1454; G06F 17/30247; G06F 17/30554; G06F 21/74; G06F 21/84; G06F 2221/2115; G06T 19/006; G06T 2219/024; G06T 19/00; G02B 27/0172; G02B 2027/0138; G02B 2027/0187; G02B 2027/014; G02B 27/01; H04N 7/15; H04N 7/157; G06Q 50/01; G06Q 50/00; H04L 67/22; H04L 65/403; H04L 43/045; H04L 65/1089
See application file for complete search history.

(56) References Cited

U.S. PATENT DOCUMENTS

| | | | |
|---|---|---|---|
| 2007/0002037 A1* | 1/2007 | Kuroki | G06T 19/006 345/418 |
| 2012/0249591 A1* | 10/2012 | Maciocci | G06F 3/011 345/633 |
| 2016/0054793 A1* | 2/2016 | Kasahara | G06F 3/0488 345/633 |

OTHER PUBLICATIONS

Bauer et al. "Where Are You Pointing At? A Study of Remote Collaboration in a Wearable Videoconference System." Third International Symposium on Wearable Computers. Oct. 18-19, 1999:151-158.

Theoktisto et al. "Enhancing collaboration in virtual reality applications." Computers and Graphics. Oct. 1, 2005:704-718. vol. 29, No. 5.

Makita et al., "Mixed Reality Navigation on a Tablet Computer for Supporting Machine Maintenance in Wide-area Indoor Environment," Proceedings of ICServ2014, pp. 41-47, 2014.

Office Action issued in Chinese Appln. No. 201610373474.X dated Jul. 16, 2018. English translation provided.

* cited by examiner

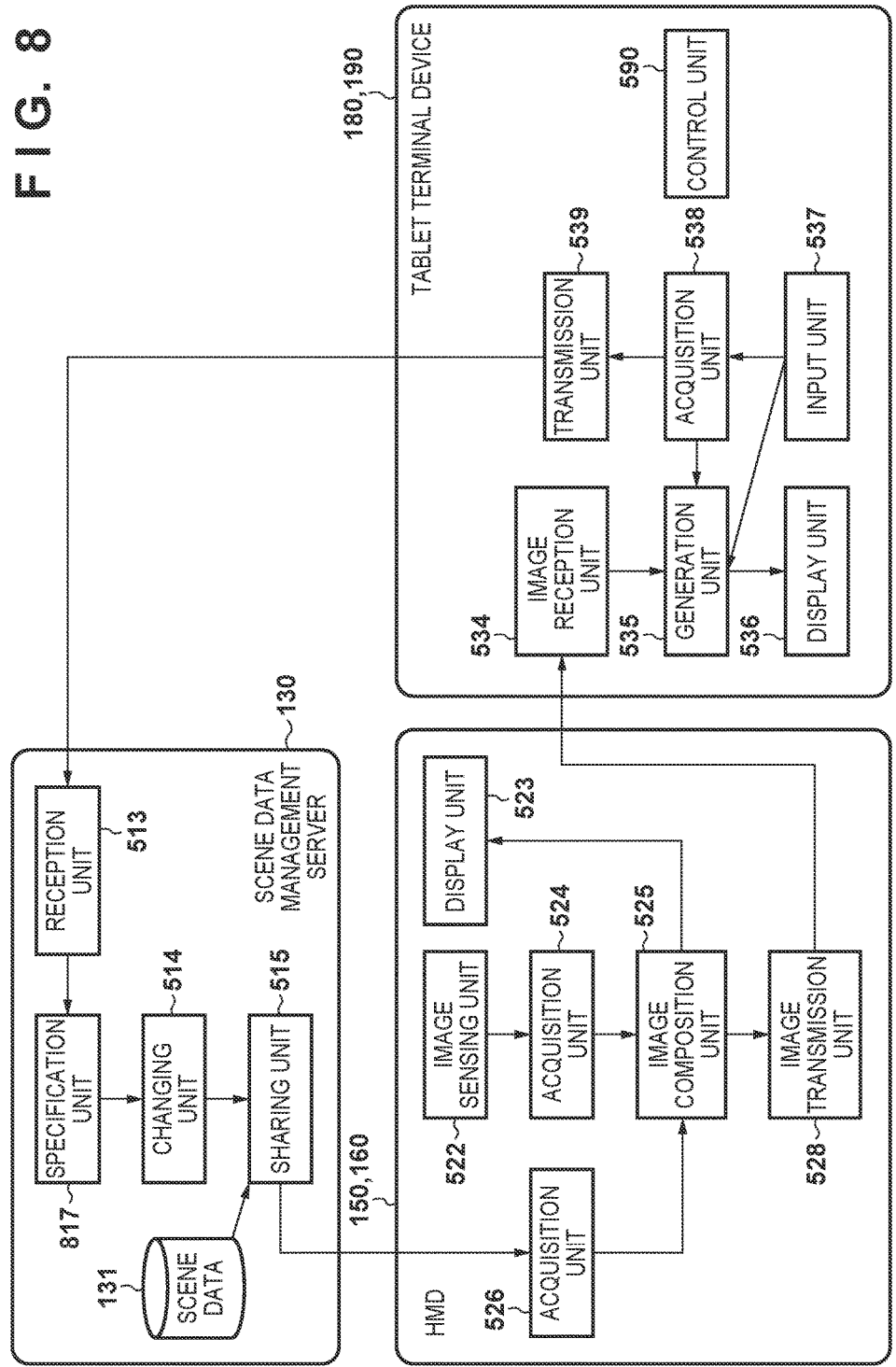

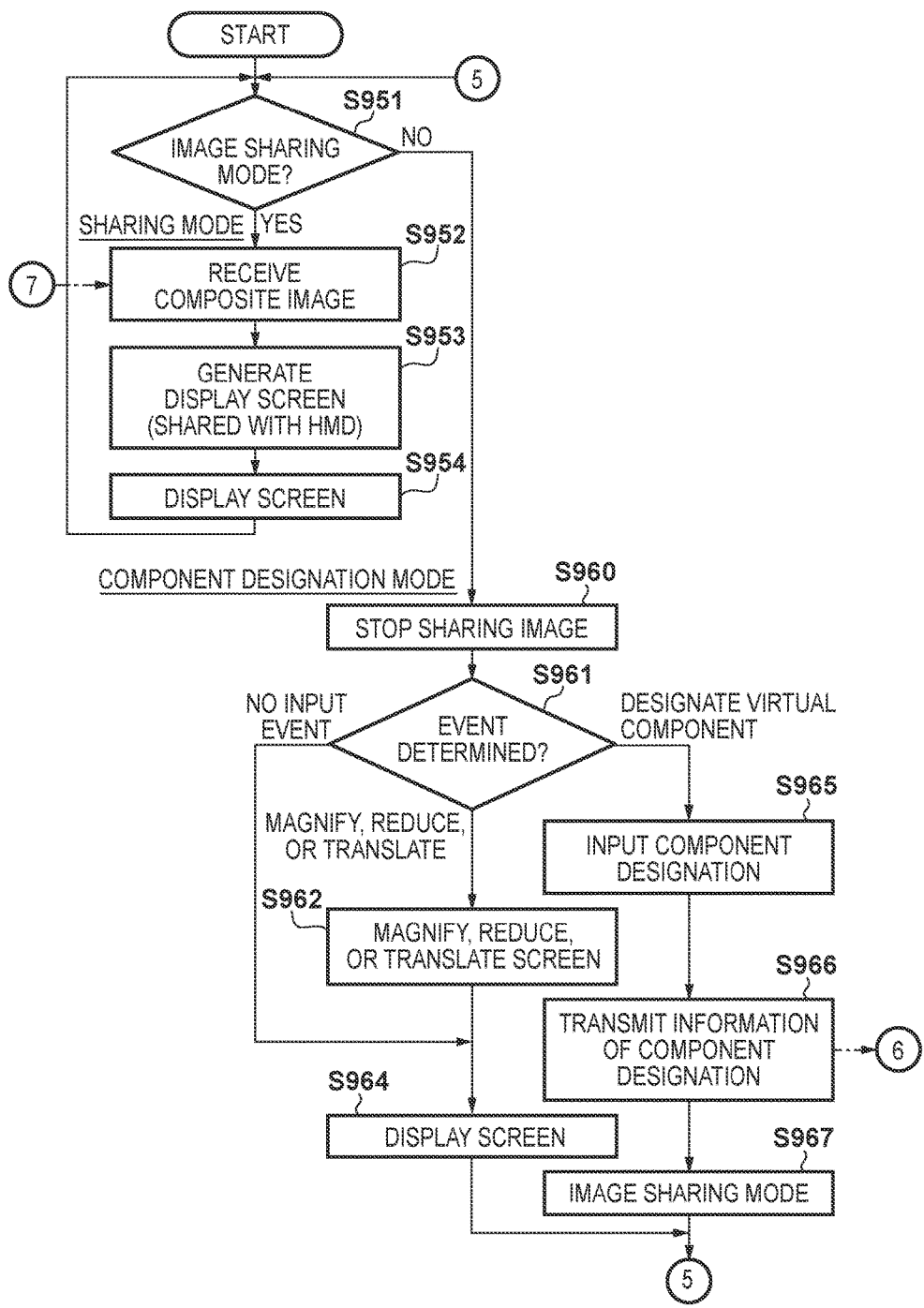

INFORMATION PROCESSING APPARATUS, INFORMATION PROCESSING METHOD, NON-TRANSITORY COMPUTER-READABLE STORAGE MEDIUM, AND SYSTEM

BACKGROUND OF THE INVENTION

Field of the Invention

The present invention relates to an information processing apparatus, an information processing method, and a system, particularly to a technique for presenting mixed reality.

Description of the Related Art

In the industry of manufacturing automobiles, aircrafts, and the like, there is a demand for reducing a period of designing processes and cost saving. One technique that satisfies such a demand is a mixed reality (MR) system that seamlessly composites a physical space with a virtual space. The mixed reality system can display a product under development as a computer graphics (CG) image superimposed over a physical world. In this way, the product is checked and examined from free viewpoints, which allows for examination of designs and the like without creating a full-scale model.

In the mixed reality system, a head-mounted display (HMD) including an image sensing device, such as a video camera, and a display in an integrated manner is used as an image display device. The HMD comes in various forms, one example of which is a video see-through method. This method displays an image of a virtual space generated in accordance with the position and orientation of the image sensing device mounted in the HMD, in such a manner that the image of the virtual space is superimposed over an image of a physical space captured by the image sensing device. Examples of the image of the virtual space include a virtual object rendered using CG, and character information. There is also an image display device using an optical see-through method. This method displays an image of a virtual space generated in accordance with the position and orientation of a viewpoint of an observer on an optically transmissive display that is worn on the head of a subject.

In the manufacturing industry, a review conducted by many people often takes place during designing processes. In a review that uses a mixed reality system, the system is configured by combining an HMD and hand-held information terminals, such as tablets, to allow many people to experience a mixed reality space (a space created by compositing a virtual space and a physical space). In this system, an image of the mixed reality space viewed by a person wearing the HMD is simultaneously distributed and displayed on a plurality of tablet screens. This allows a plurality of people to simultaneously share the view seen by the person wearing the HMD and participate in designing and examination.

Japanese Patent Laid-Open No. 2006-293604 discloses an example of cooperative work using a mixed reality system. In this example, a plurality of remote participants share a mixed reality space experienced by a worker, and cooperative work is enabled as they seamlessly perceive physical objects and virtual objects while changing a viewpoint(s).

On the other hand, Makita et al., "Mixed Reality Navigation on a Tablet Computer for Supporting Machine Maintenance in Wide-area Indoor Environment," Proc. of ICServ2014, pp. 41-47, 2014 discloses a technique to switch between display in an augmented reality (AR) display mode and a virtual reality (VR) display mode in a navigation system. This technique can support actions of a user by enabling the user to appropriately grasp the surrounding situation. Furthermore, a commercial graphics library has been provided with a function of obtaining correspondence between arbitrary points on a screen (a plane of a displayed image) and components constituting a three-dimensional model in a virtual space through the reverse perspective projection conversion.

Assume a case in which a tablet user designates a component of a virtual object displayed on a screen of a tablet while the tablet is sharing an image with an HMD user in a mixed reality system. In this case, as the HMD user changes the position and orientation of a viewpoint by their own will, the tablet user who is sharing the image cannot control the position and orientation of the viewpoint with respect to the virtual object. That is to say, a display screen of the tablet changes independently of the intention of the tablet user, which makes it difficult to accurately designate a desired component.

SUMMARY OF THE INVENTION

The present invention has been made in view of the above problem, and provides a technique to, when an image of a mixed reality space viewed by a user wearing an HMD or a similar head-mounted display device is shared and displayed on other devices, enable easy and accurate designation of a virtual object in the shared image on display screens of the other devices.

According to the first aspect of the present invention, there is provided an information processing apparatus connected to a first display device and a second display device, the information processing apparatus comprising: a generation unit configured to generate an image of a virtual object in accordance with a position and an orientation of the first display device; a display control unit configured to in a case where a first mode is set, cause the first display device and the second display device to display the image of the virtual object generated by the generation unit, and in a case where a second mode different from the first mode is set, cause the second display device to display a still image of the virtual object; a selection unit configured to select a portion of the virtual object in the still image based on an instruction input by a user observing the second display device during display of the still image of the virtual object; and an updating unit configured to update an image of the virtual object displayed by the second display device based on the selected portion of the virtual object.

According to the second aspect of the present invention, there is provided an information processing method performed by an information processing apparatus connected to a first display device and a second display device, the information processing method comprising: generating an image of a virtual object in accordance with a position and an orientation of the first display device; in a case where a first mode is set, causing the first display device and the second display device to display the generated image of the virtual object; in a case where a second mode different from the first mode is set, causing the second display device to display a still image of the virtual object; selecting a portion of the virtual object in the still image based on an instruction input by a user observing the second display device during display of the still image of the virtual object; and updating an image of the virtual object displayed by the second display device based on the selected portion of the virtual object.

According to the third aspect of the present invention, there is provided a non-transitory computer-readable storage medium storing a computer program for causing a computer connected to a first display device and a second display device to function as: a generation unit configured to generate an image of a virtual object in accordance with a position and an orientation of the first display device; a display control unit configured to in a case where a first mode is set, cause the first display device and the second display device to display the image of the virtual object generated by the generation unit, and in a case where a second mode different from the first mode is set, cause the second display device to display a still image of the virtual object; a selection unit configured to select a portion of the virtual object in the still image based on an instruction input by a user observing the second display device during display of the still image of the virtual object; and an updating unit configured to update an image of the virtual object displayed by the second display device based on the selected portion of the virtual object.

According to the fourth aspect of the present invention, there is provided a system, comprising: a first display device; a second display device; and an information processing apparatus connected to the first display device and the second display device, wherein the information processing apparatus includes: a generation unit configured to generate an image of a virtual object in accordance with a position and an orientation of the first display device; a display control unit configured to in a case where a first mode is set, cause the first display device and the second display device to display the image of the virtual object generated by the generation unit, and in a case where a second mode different from the first mode is set, cause the second display device to display a still image of the virtual object; a selection unit configured to select a portion of the virtual object in the still image based on an instruction input by a user observing the second display device during display of the still image of the virtual object; and an updating unit configured to update an image of the virtual object displayed by the second display device based on the selected portion of the virtual object.

Further features of the present invention will become apparent from the following description of exemplary embodiments (with reference to the attached drawings).

BRIEF DESCRIPTION OF THE DRAWINGS

FIG. 8 is a block diagram of an exemplary functional configuration of a system.

FIGS. 9A and 9B are flowcharts of processing executed by a system.

DESCRIPTION OF THE EMBODIMENTS

The following describes embodiments of the present invention with reference to the attached drawings. Note that the embodiments described below are examples of specific embodiments of the present invention, and represent specific working examples of the configurations described in the claims.

First Embodiment

An information processing apparatus according to the present embodiment is connected to a first display device and a second display device, generates an image of a virtual object in accordance with a position and orientation of the first display device, causes the first display device and the second display device to display the generated image of the virtual object in a case where a first mode is set, causes the second display device to display a still image of the virtual object in a case where a second mode different from the first mode is set, selects a portion of the virtual object in the still image based on an instruction input by a user observing the second display device during display of the still image of the virtual object, and updates the image of the virtual object displayed on the second display device based on the selected portion of the virtual object.

Figure 1:
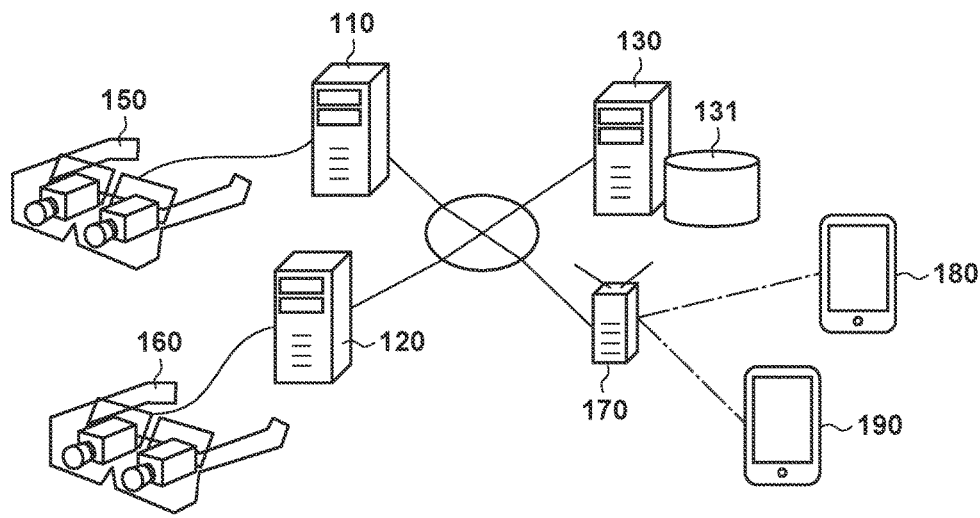
FIG. 1 shows an exemplary configuration of a system.

First, an exemplary configuration of a system according to the present embodiment will be described using FIG. 1. As shown in FIG. 1, the system according to the present embodiment includes HMDs 150, 160, HMD control devices 110, 120, a scene data management server 130, a wireless LAN access point 170, and tablet terminal devices 180, 190.

The HMDs 150, 160 are examples of head-mounted display devices, and present an image of a mixed reality space obtained by compositing an image of a physical space with an image of a virtual space in front of the eyes of users wearing the HMDs 150, 160 on their head.

The HMD control devices 110, 120 respectively control basic operations of the HMDs 150, 160, including power management for the HMDs 150, 160 and communication performed by the HMDs 150, 160, and perform wireless or wired data communication with the HMDs 150, 160.

The scene data management server 130 holds data (scene data) 131 necessary for constructing a virtual space (scene). Note that the HMD control devices 110, 120 and the scene data management server 130 may be discrete devices as shown in FIG. 1, or may constitute one integrated device. Examples of devices that can be used as the HMD control devices 110, 120 and the scene data management server 130 include an ordinary personal computer (PC).

The wireless LAN access point 170 functions as a wireless LAN access point for the tablet terminal devices 180, 190, and the tablet terminal devices 180, 190 perform data communication with the scene data management server 130 and the HMDs 150, 160 (via the HMD control devices 110, 120) via the wireless LAN access point 170.

The tablet terminal devices 180, 190 include touchscreens, and have functions of displaying various types of information on the touchscreens and detecting users' manipulations (contacts) on the touchscreens. Note that the tablet terminal devices 180, 190 may be any devices that have a function of accepting various instructions from the users and a function of displaying various types of information.

As shown in FIG. 1, the tablet terminal devices 180, 190 and the wireless LAN access point 170 are connected via a wireless LAN, and the HMD control devices 110, 120, the scene data management server 130, and the wireless LAN access point 170 are connected to a network in such a manner that they can perform data communication with one another.

In the present embodiment, the HMD 150/160 captures an image of a physical space, generates an image of a virtual space in accordance with the position and orientation of the HMD 150/160 using the scene data 131, generates an image of a mixed reality space by compositing the captured image of the physical space with the generated image of the virtual space, displays the generated image of the mixed reality space, and transmits the generated image of the mixed reality space to one or both of the tablet terminal devices 180, 190 that is/are associated with the HMD 150/160. In this way, for example, the image of the mixed reality space displayed on the HMD(s) associated with the tablet terminal device 180 is displayed on a display screen of the tablet terminal device 180, and consequently, the tablet terminal device 180 can share the image of the mixed reality space with the HMD(s). A description is now given of sharing of an image of a mixed reality space between an HMD and a tablet terminal device using FIG. 2.

A user 230 is wearing an HMD on their head, and a projection image obtained by projecting a mixed reality space including a virtual object 220 onto a virtual screen 231 is displayed on a screen of the HMD. Markers 211, 212 are provided on the walls and floor of a physical space to obtain the position and orientation of the HMD, and it will be assumed here that the HMD captures an image of the physical space and obtains its position and orientation using the markers shown in the captured image.

The image of the mixed reality space displayed on the HMD worn on the head of the user 230 is also transmitted to a tablet terminal device 250 associated with the HMD, and displayed on a display screen 251 of the tablet terminal device 250. This allows a user 240 to check (share), on the display screen 251, the image of the mixed reality space observed by the user 230.

Figure 5:
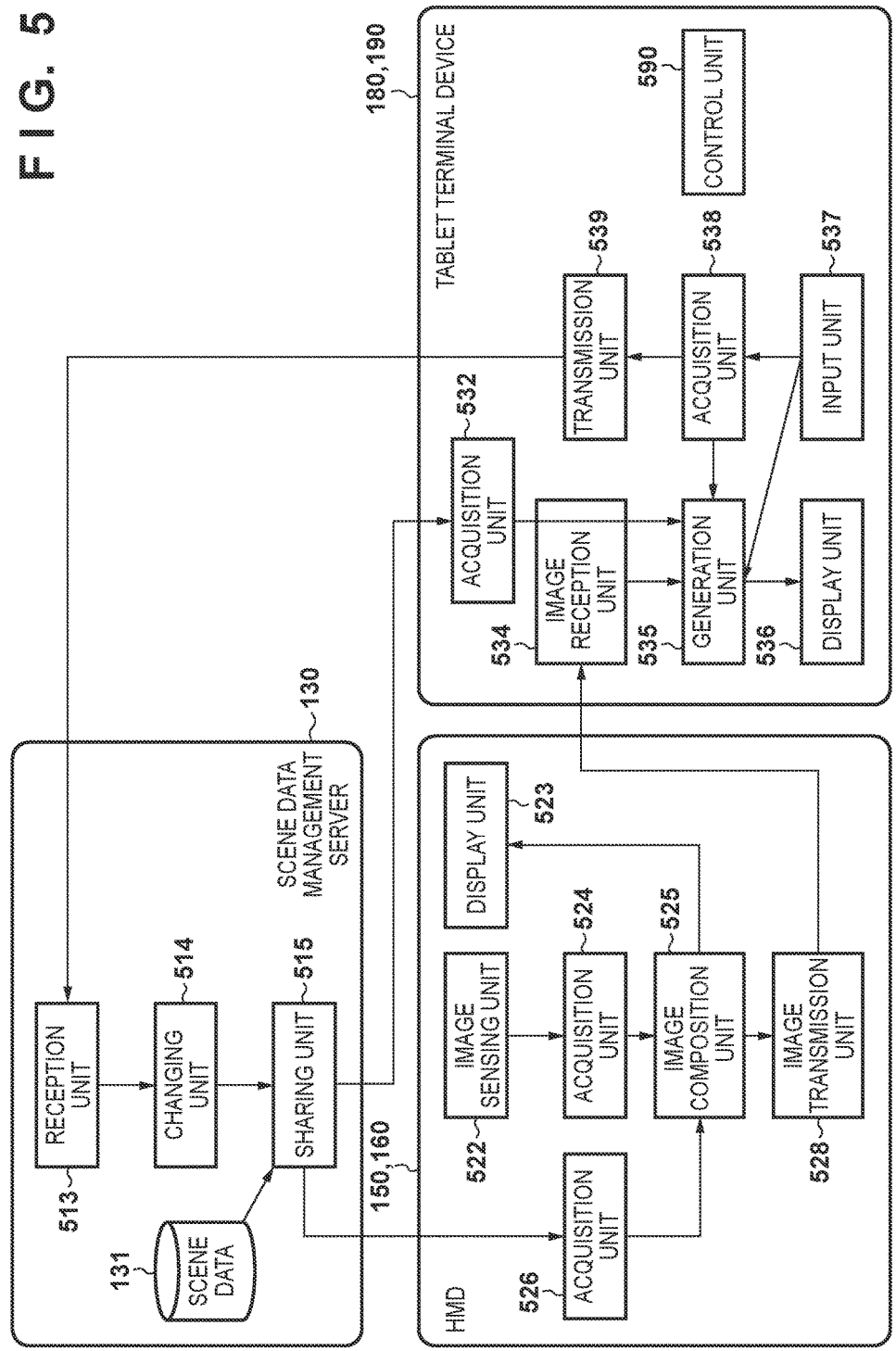
FIG. 5 is a block diagram of an exemplary functional configuration of a system.

FIG. 5 shows exemplary functional configurations of the scene data management server 130, the HMD 150/160, and the tablet terminal device 180/190. Note that in FIG. 5, for the sake of simplicity, the HMD control devices 110, 120 are omitted, and the HMD 150/160 performs data communication directly with the scene data management server 130 and the tablet terminal device 180/190; however, in practice, the HMD 150/160 performs data communication with the scene data management server 130 and the tablet terminal device 180/190 via the HMD control device 110/120 as shown in FIG. 1. A description is now given of processing executed by the functional units shown in FIG. 5 in line with flowcharts of FIGS. 6A and 6B.

<Step S621>
An image sensing unit 522 included in the HMD 150/160 captures an image of a physical space.

Figure 2:
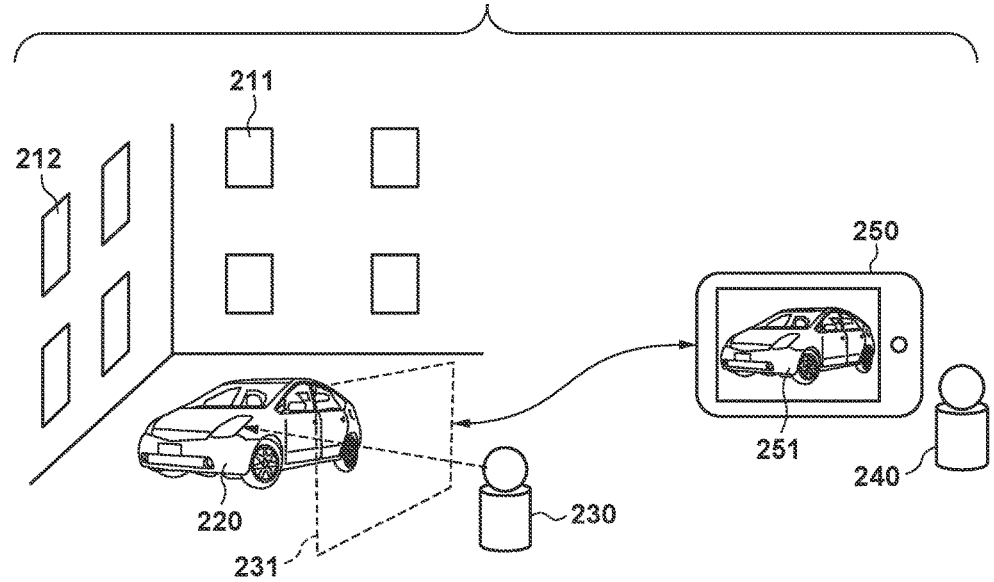
FIG. 2 shows sharing of an image of a mixed reality space.

<Step S622>
An acquisition unit 524 included in the HMD 150/160 acquires the position and orientation of the HMD 150/160. A method of acquiring the position and orientation of the HMD 150/160 may be selected from among various conceivable methods. For example, markers may be provided in the physical space as shown in FIG. 2, and the position and orientation of the HMD 150/160 may be obtained using the markers (or natural features) shown in the image that was acquired by capturing the physical space provided with the markers in step S621. Furthermore, the position and orientation of the HMD 150/160 may be obtained based on the result of measurement by a sensor, such as an infrared sensor, a magnetic sensor, an ultrasonic sensor, an optical sensor, and a gyroscope. Furthermore, the position and orientation of the HMD 150/160 may be obtained using the markers in the image and the result of measurement by the sensor. Note that the "position and orientation of the HMD 150/160" mentioned here denote the "position and orientation of the image sensing unit 522 in a world coordinate system (a coordinate system in which one point in the physical space serves as the origin, and three axes that are orthogonal to one another at the origin are regarded as an x-axis, a y-axis, and a z-axis)," and may hereinafter be referred to as the "position and orientation of a viewpoint."

<Step S624>
An image compositing unit 525 first constructs a virtual space using the "scene data 131 that an acquisition unit 526 acquired (downloaded) from the scene data management server 130 in step S630." The scene data 131 is data that defines the virtual space, such as data of virtual objects constituting the virtual space (data of shapes, textures, etc. necessary for rendering the virtual objects), data of the positions and orientations of the virtual objects, and data that defines a light source illuminating the virtual space. Next, the image compositing unit 525 generates an image of the virtual space as viewed from the viewpoint with the position and orientation acquired in step S622. As a technique to generate the image of the virtual space as viewed from the viewpoint with the position and orientation is known, a description of such a technique will be omitted.

<Step S625>
The image compositing unit 525 generates an image of a mixed reality space by superimposing the image of the virtual space generated in step S624 over the image of the physical space captured by the image sensing unit 522 in step S621. As a technique to generate the image of the mixed reality space is known, a description of such a technique will be omitted.

<Step S626>
The image compositing unit 525 outputs the image of the mixed reality space generated in step S625 to a display unit 523, thereby causing the display unit 523 to display the image. The display unit 523 is attached to the HMD 150/160 so as to be located in front of the eyes of a user wearing the HMD 150/160 on their head. In this way, the image of the mixed reality space generated in step S625 can be presented in front of the eyes of the user wearing the HMD 150/160 on their head.

<Step S627>
An image transmission unit 528 transmits the image of the mixed reality space generated by the image compositing unit 525 in step S625 to one or both of the tablet terminal devices 180, 190 that is/are associated with the HMD 150/160. A tablet terminal device(s) that serves as a transmission destination of the image of the mixed reality space generated by the HMD 150/160 may be set in advance, or may be set by the HMD 150/160 and/or the tablet terminal device(s) at an arbitrary timing. Such setting may be configured in the HMD control device 110/120 so that the HMD control device 110/120 transmits the image of the mixed reality space from the HMD 150/160 to a transmission destination specified by such setting. The image transmission unit 528 may code the image of the mixed reality space in accordance with JPEG, H.264, or the like, and then transmit the coded image. The image of the mixed reality space may be transmitted using a streaming protocol, such as RTP.

<Step S651>
A control unit 590 checks which one of an MR mode (sharing mode) and a VR mode is set as an operation mode of the tablet terminal device 180/190. A method of switching the operation mode of the tablet terminal device 180/190 is not limited to a particular method, and may be selected from among various conceivable methods. For example, when a display unit 536 and an input unit 537 constitute a touch-screen, a button image for switching to the MR mode (MR mode button image) and a button image for switching to the VR mode (VR mode button image) are displayed on the display unit 536. If the input unit 537 detects a user's tap on the MR mode button image on the touchscreen, the control unit 590 switches the operation mode of the tablet terminal device 180/190 to the MR mode. On the other hand, if the input unit 537 detects a user's tap on the VR mode button image on the touchscreen, the control unit 590 switches the operation mode of the tablet terminal device 180/190 to the VR mode. Such a mode switching request can be detected in non-illustrated separate processing for detecting a user input event.

Processing proceeds to step S652 if the operation mode of the tablet terminal device 180/190 is the MR mode, and to step S660 if the operation mode is the VR mode.

<Step S652>

An image reception unit 534 receives the image of the mixed reality space transmitted from the image transmission unit 528. Note that when the received image of the mixed reality space has been coded, the received image is decoded.

<Step S653>

A generation unit 535 generates a display screen by converting the image of the mixed reality space received in step S652 into an image suited for the display unit 536. For example, the size of the image of the mixed reality space received in step S652 is converted in accordance with the resolution of the display unit 536. Alternatively, in the present step, a dialogue screen including a display area and a manipulation area may be generated as the display screen, in such a manner that the image of the mixed reality space is displayed in the display area, and a button and the like that allow for various manipulations are arranged in the manipulation area.

<Step S654>

The generation unit 535 displays the display screen generated in step S653 on the display unit 536. As a result, the display unit 536 displays an image having the same contents as the image of the mixed reality space that is displayed on the HMD in step S626, thereby sharing the image of the mixed reality space with the HMD.

<Step S660>

The image reception unit 534 stops the operation of receiving the image of the mixed reality space transmitted from the image transmission unit 528. Note that when the operation mode is the VR mode and sharing of the image has already been stopped, processing of step S660 may be skipped.

<Step S661>

If the input unit 537 detects an input event indicating that a user has performed manipulation input for changing the position and orientation of a viewpoint that is locally controllable on the tablet terminal device 180/190 (local viewpoint), processing proceeds to step S662. If the input unit 537 detects an input event indicating that the user has performed manipulation input for designating a portion (component) of a virtual object displayed on the display unit 536, processing proceeds to step S665. If no input event is detected, processing proceeds to step S663.

<Step S663>

The generation unit 535 first constructs a virtual space using the "scene data 131 that an acquisition unit 532 acquired (downloaded) from the scene data management server 130 in step S640." Then, the generation unit 535 generates an image of the virtual space as viewed from the local viewpoint. Note that the control unit 590 acquires the position and orientation of the HMD (associated with the tablet terminal device 180/190) immediately before switching to the VR mode from the HMD, and sets them as the position and orientation of the local viewpoint immediately after switching to the VR mode. In this setting, not only the position and orientation but other parameters, such as an angle of view, may be set. The parameters including the position, orientation, and angle of view of the HMD 150/160 may be managed by the HMD control device 110/120, in which case the control unit 590 acquires the parameters including the position, orientation, and angle of view of the HMD 150/160 from the HMD control device 110/120.

<Step S664>

The generation unit 535 displays the image of the virtual space generated in step S663 on the display unit 536.

<Step S662>

The input unit 537 changes the position and orientation of the local viewpoint in accordance with the user's manipulation for changing the position and orientation of the local viewpoint (e.g., a manipulation involving drag, zoom-in, zoom-out, or the like on a screen of the display unit 536). Thereafter, an image of a virtual space based on the changed position and orientation is generated in step S663, and the image of the virtual space based on the changed position and orientation is displayed on the display unit 536 in step S664.

Figure 3B:
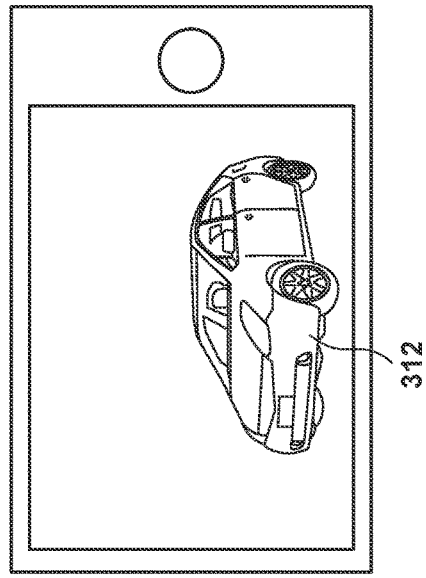
FIGS. 3A to 3D show transition of a screen of a tablet terminal device.
Figure 3D:
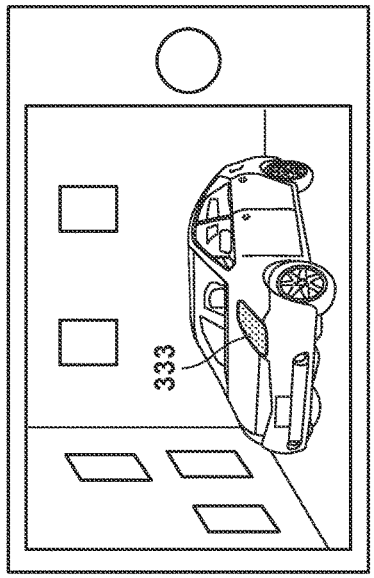
Figure 3A:
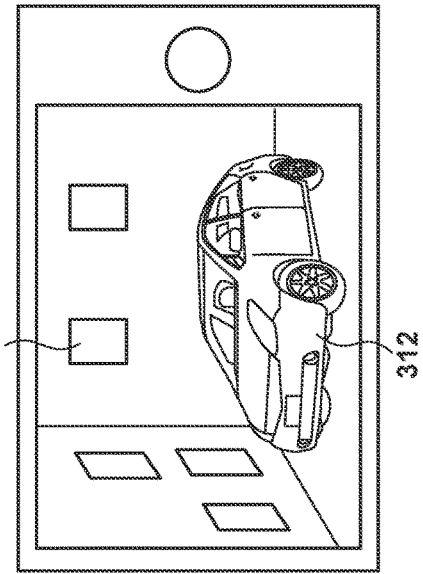

For example, assumed a case in which the display unit 536 of a tablet terminal device set to an MR mode displays an image of a mixed reality space obtained by compositing an image of a physical space including a marker 311 with an image of a virtual space including a virtual object 312 as shown in FIG. 3A. In this case, if an operation mode of the tablet terminal device is switched to a VR mode, the display unit 536 displays an image of the virtual object 312 as viewed from a local viewpoint with the same viewpoint position and orientation as FIG. 3A in the immediately succeeding step S664 as shown in FIG. 3B. Note that in the VR mode, the image of the physical space is not displayed in a superimposed manner. On the tablet terminal device set to the VR mode, a user can perform a manipulation for changing the position and orientation of the local viewpoint, and if the user actually performs the manipulation for changing the position and orientation of the local viewpoint, the position and orientation of the local viewpoint are changed in accordance with the changing manipulation, and the display unit 536 displays an image of the virtual object based on the local viewpoint with the changed position and orientation; in this way, the position and orientation of the viewpoint can be independently changed on the tablet terminal device irrespective of a change in the position and orientation of the associated HMD, and the resultant image of the virtual object can be browsed on the display unit 536.

<Step S665>

An acquisition unit 538 specifies a virtual component (constituting the virtual object) displayed on a display screen of the display unit 536 at a position designated (e.g., tapped) by the user. Processing for such specification is not limited to a particular method, and may be selected from among various types of conceivable processing. For example, at first, on a virtual screen, a position (three-dimensional coordinates) corresponding to the designated position on the display screen of the display unit 536 is specified since positions on the virtual screen can be expressed three-dimensional coordinates and a relationship between positions on the display screen of the display unit 536 and the positions on the virtual screen (note that the virtual screen is provided as a plane which is distanced from the position of the local viewpoint by a prescribed distance in a line-of-sight direction of the local viewpoint, and on which the line-of-sight direction serves as a normal direction; the position and orientation of the virtual screen in the world coordinate system can be obtained from the position and orientation of the local viewpoint, and the size (width and height) of the virtual screen and the above-referenced "prescribed distance" are set based on the screen size, viewing angle, and the like of the display unit 536) has one-to-one correspondence. Then, points of intersection between a straight line passing through the specified position and the position of the local viewpoint and the virtual object are searched for; if there is no point of intersection, no virtual component is displayed at the designated position, and if there are points of intersection, a point of intersection closest to the position of the local viewpoint is specified from among the points of intersection, and a virtual component including the specified point of intersection is specified as the "component designated by the user."

Then, the acquisition unit 538 acquires identification information unique to the virtual component that has been specified as the "component designated by the user" (e.g., an ID unique to the virtual component) from the scene data 131 that was acquired by the acquisition unit 532 in step S640. Note that when there are multiple virtual objects in the virtual space, this identification information serves as information for uniquely specifying the virtual component that has been specified as the "component designated by the user" and a virtual object to which the virtual component belongs.

<Step S666>

A transmission unit 539 transmits, to the scene data management server 130, the identification information that the acquisition unit 538 acquired from the scene data 131 in step S665, that is to say, the identification information of the virtual component serving as the "component designated by the user."

<Step S667>

The control unit 590 switches the operation mode of the tablet terminal device 180/190 from the VR mode to the MR mode. When the operation mode of the tablet terminal device 180/190 has been switched to the MR mode, the image reception unit 534 restarts the operation of receiving the image of the mixed reality space transmitted from the image transmission unit 528.

<Step S611>

A reception unit 513 receives the identification information that was transmitted from the transmission unit 539 in step S666.

<Step S614>

A changing unit 514 processes, among the scene data 131, data of the virtual component corresponding to the identification information that was received by the reception unit 513 in step S611, so that the virtual component corresponding to the identification information is visually distinguishable from other virtual components. For example, the color of the virtual component corresponding to the identification information is changed to a color different from the colors of other virtual components so that the virtual component corresponding to the identification information is highlighted.

<Step S615>

A sharing unit 515 transmits the scene data 131 to the HMD 150/160 and the tablet terminal device 180/190.

Figure 3C:
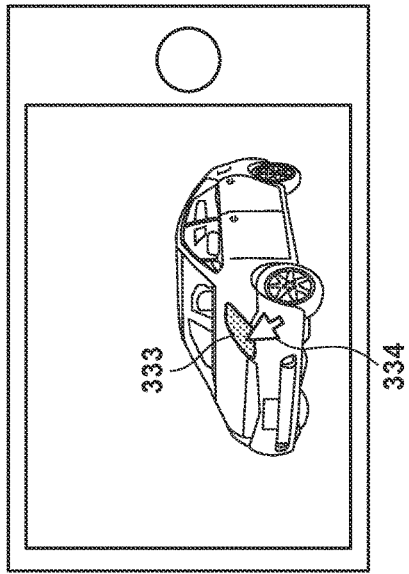

For example, if the user taps a headlight of the virtual object 312 that is being displayed on the display screen of the tablet terminal device as shown in FIG. 3B, data of the headlight is updated through the foregoing process so that the headlight, i.e., the tapped virtual component is visually distinguishable from other virtual components; as a result, a headlight 333 is highlighted as shown in FIG. 3C. A cursor 334 is displayed at a tap position. After switching to the MR mode, the headlight 333 is highlighted in the image of the mixed reality space as shown in FIG. 3D. As described above, the scene data 131 shared among all tablet terminal devices is updated to highlight the headlight 333, and thus such highlight on the headlight 333 is reflected in the image of the mixed reality space observed on all of the HMDs and tablet terminal devices.

Figure 6A:
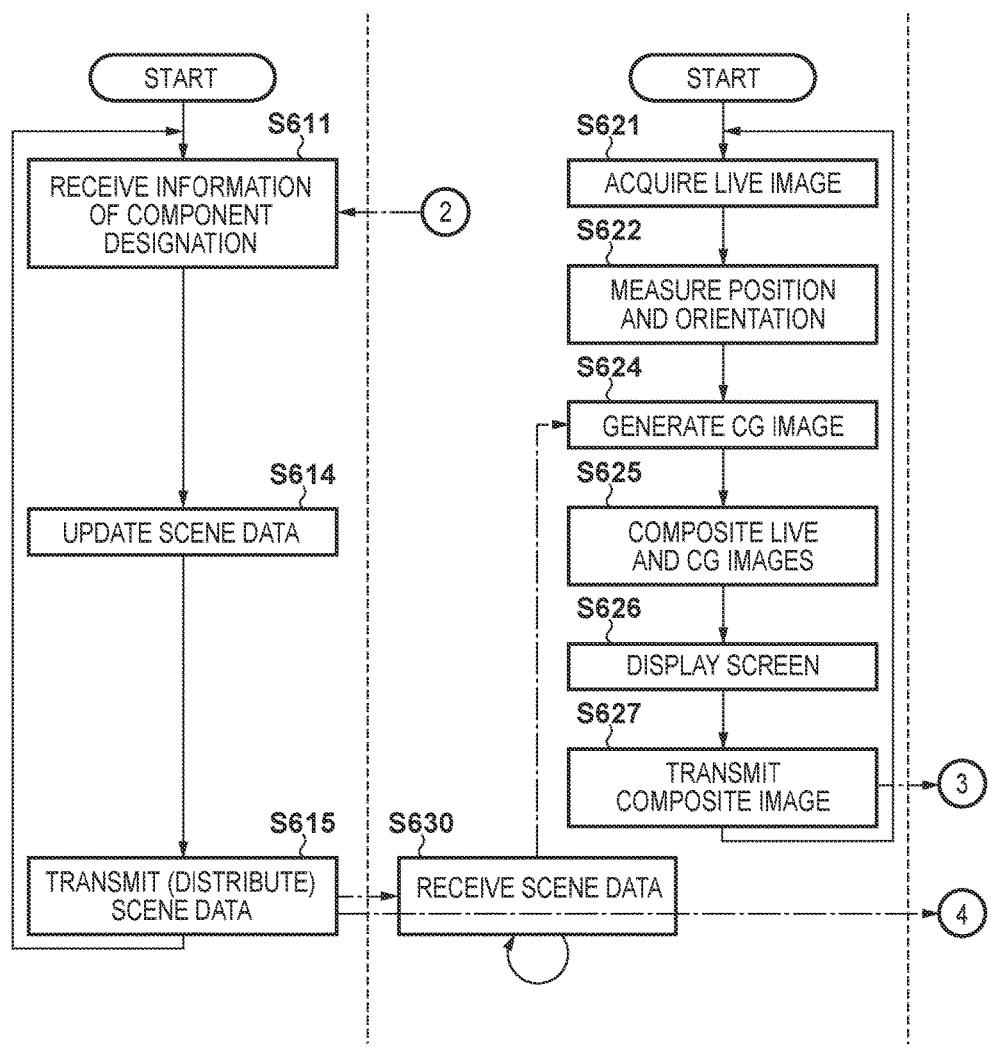
FIGS. 6A and 6B are flowcharts of processing executed by a system.
Figure 6B:
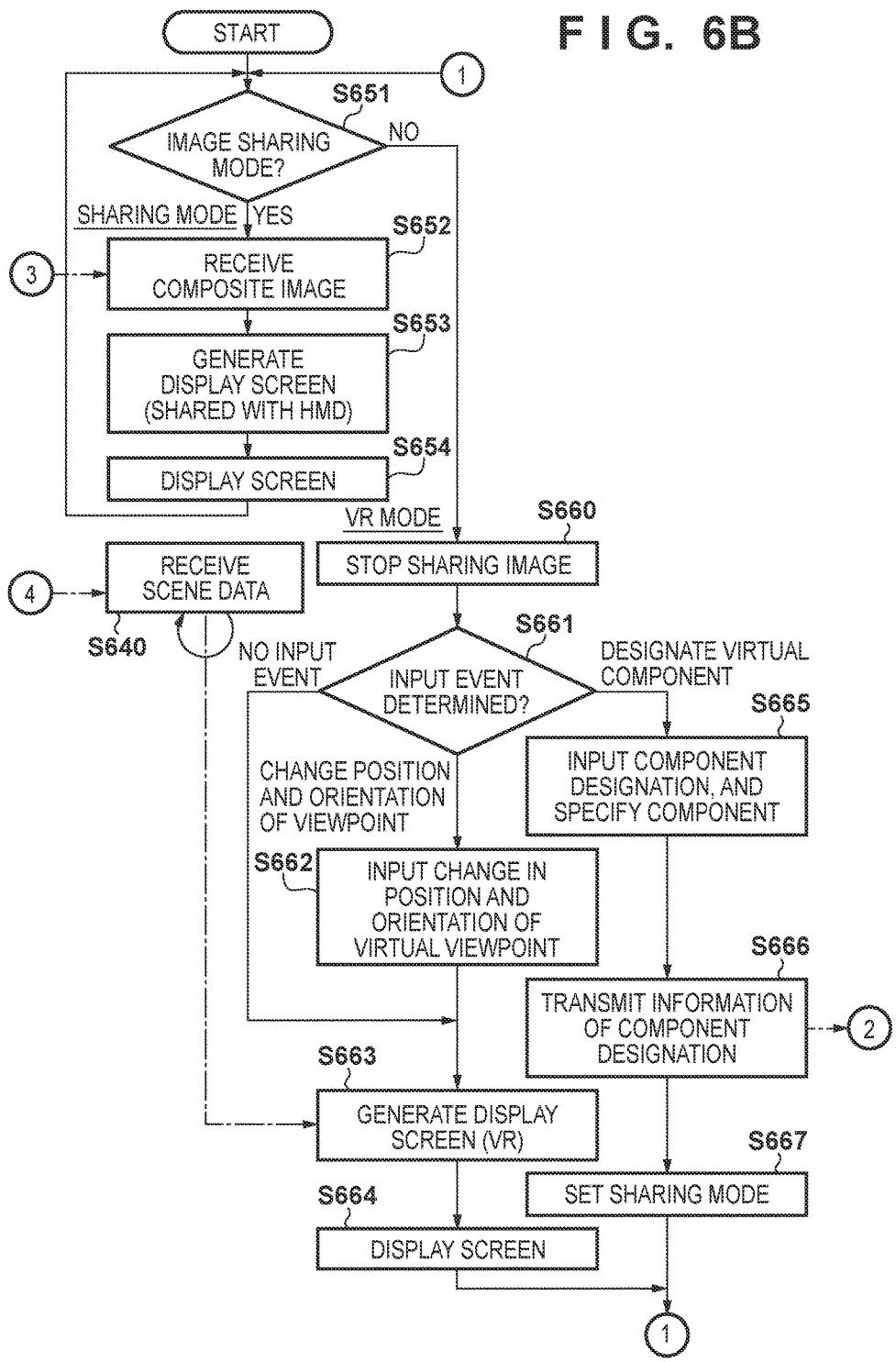

Although such highlight is made in the MR mode in processing of the flowcharts of FIGS. 6A and 6B as shown in FIG. 3D, such highlight may be made in the VR mode as shown in FIG. 3C.

Note that the HMDs used in the present embodiment may be replaced with information terminal devices, such as tablets, or may be replaced with cameras installed at fixed positions.

According to the above-described present embodiment, in a system where HMDs and tablet terminal devices share an image of a mixed reality space, a viewpoint can be independently set on the tablet terminal devices in observing a virtual object, and a virtual component can be designated on the tablet terminal devices to present the designated virtual component to other people observing the mixed reality space; this can facilitate collaborative work that utilizes the foregoing system in which multiple people participate.

Note that a part of processing that is executed by the HMDs in the above description, such as generation of an image of a virtual space and generation of an image of a mixed reality space, may be executed by the HMD control devices. That is to say, a part of processing that is executed by one device in the above description may be executed by another device. In general, a system design concerning correspondence between processing and devices, the number of devices to be used, and the like is not limited to the configurations shown in FIG. 5, and may be based on various conceivable configurations as long as processing that is equivalent to or exceeds processing described in the first embodiment can be realized. The same goes for the second and subsequent embodiments.

First Modification Example

In the first embodiment, changing the position and orientation of a local viewpoint in a VR mode allows a virtual object to be observed from various angles; to achieve a similar effect, after switching to the VR mode, the virtual object itself may be moved/rotated while keeping the position and orientation of the viewpoint fixed (the position and orientation of an HMD immediately before transition to the VR mode are maintained). In this case, a tablet terminal device may move/rotate the virtual object by constructing a virtual space using the scene data downloaded from the scene data management server 130, and then changing the position and orientation of the virtual object defined by the scene data.

Second Modification Example

Second Embodiment

In the present embodiment, upon switching from an MR mode to a VR mode on a tablet terminal device, a virtual component is designated using an image (still image) of a mixed reality space that was received from an HMD before switching to the VR mode. The following description will be given with a focus on differences from the first embodiment, and it will be assumed that the present embodiment is similar to the first embodiment unless particularly mentioned in the following description.

That is to say, a system according to the present embodiment is an example of a system including an image display device, a holding device that holds data of a virtual object, and a display device that displays an image of a mixed reality space including an image of the virtual object based on the data. In this system, in a case where a first mode is set, the image display device acquires an image of a mixed reality space from the display device, and displays the acquired image. Upon switching from the first mode to a second mode, the image display device displays an image of a mixed reality space that was acquired from the displayed device before the switching, acquires a position that was designated by a user on the image of the mixed reality space displayed in the second mode, and transmits the designated position to the holding device. The holding device receives the designated position, specifies a part corresponding to the designated position among parts constituting the virtual object, and updates data of the specified part.

Figure 7B:
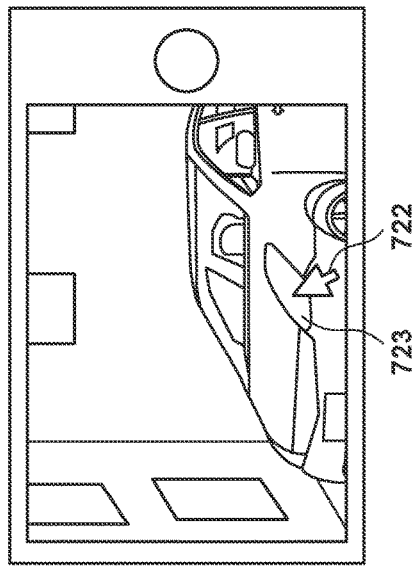
FIGS. 7A to 7C illustrate designation of a virtual component.
Figure 7C:
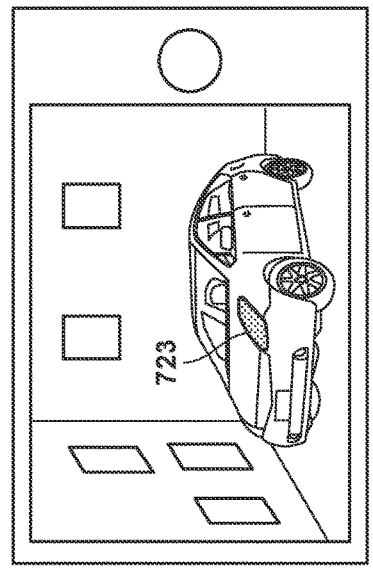
Figure 7A:
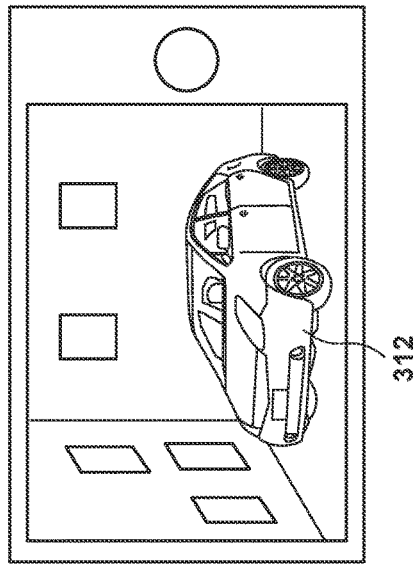

First, designation of a virtual component will be described using FIGS. 7A to 7C. The tablet terminal device holds the latest frame image of a mixed reality space received from the HMD, and upon switching to the VR mode, displays the image of the mixed reality space that is held at that point (the image of the mixed reality space received from the HMD before the switching) as shown in FIG. 7A. In the present embodiment also, reception of the image of the mixed reality space from the HMD is stopped during the VR mode. A user can magnify, reduce, or translate the image (still image) of the mixed reality space displayed on a display screen of the tablet terminal device by performing, on the display screen, a magnification manipulation, a reduction manipulation, or a translation manipulation (drag) with respect to the image of the mixed reality space displayed on the display screen. In FIG. 7B, the image of the mixed reality space received from the HMD is partially displayed in a magnified manner. If the user taps a desired virtual component 723 on the display screen as shown in FIG. 7B (a cursor 722 is displayed at a tap position), the tapped virtual component 723 is subsequently highlighted as shown in FIG. 7C, similarly to the first embodiment.

Figure 9A:
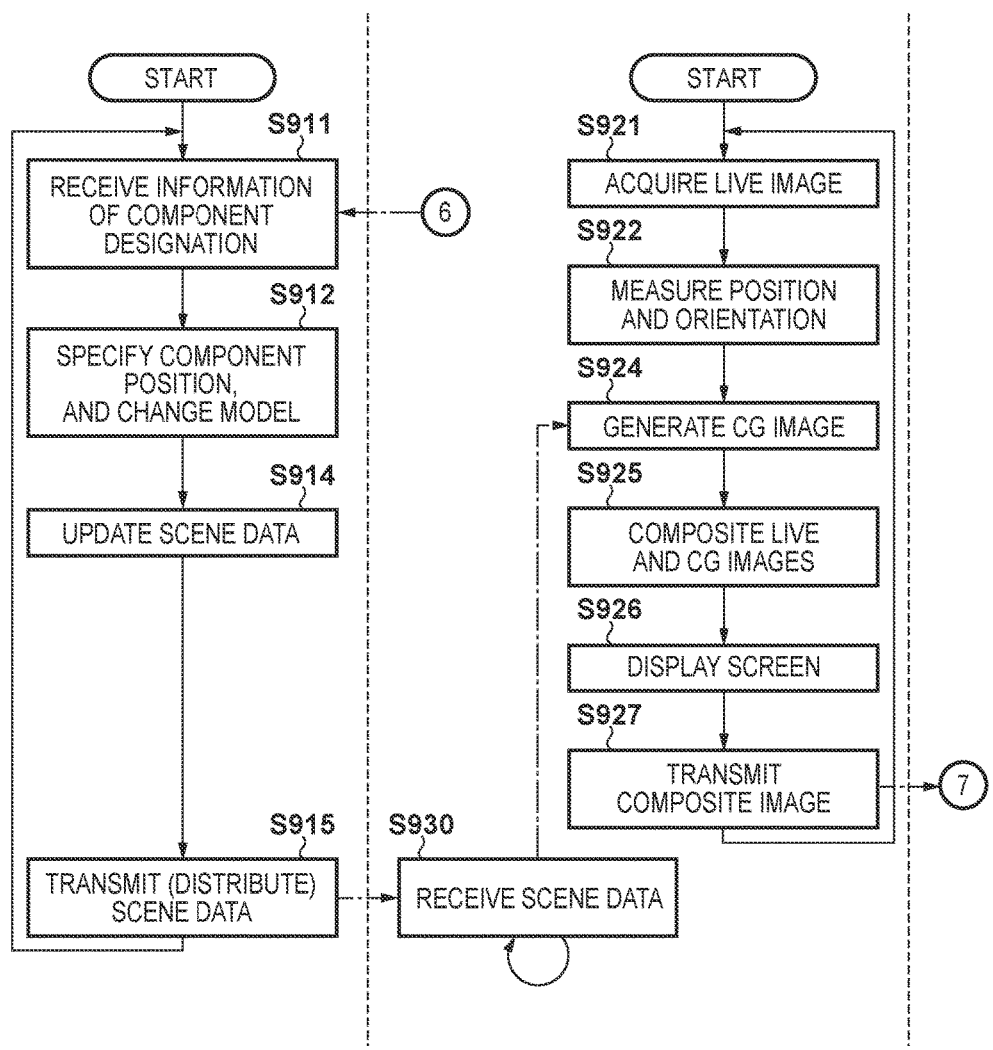

FIG. 8 shows an exemplary functional configuration of the system according to the present embodiment. A description is now given of processing executed by the functional units of this system in line with flowcharts of FIGS. 9A and 9B.

Note that processing of steps S921 to S930 is similar to processing of steps S621 to S630 described earlier, and thus a description of these steps will be omitted. Also, processing of steps S951 to S960 and step S967 is similar to processing of steps S651 to S660 and step S667 described earlier, and thus a description of these steps will be omitted.

<Step S961>

If the input unit 537 detects an input event indicating that the user has performed manipulation input for, for example, magnifying, reducing, or translating an image of a mixed reality space displayed on the display screen (gesture input on the display screen, such as a pinch-in/pinch-out manipulation), processing proceeds to step S962. If the input unit 537 detects an input event indicating that the user has performed manipulation input for designating a portion (component) of a virtual object displayed on the display unit 536, processing proceeds to step S965. If no input event is detected, processing proceeds to step S964.

<Step S962>

The generation unit 535 magnifies, reduces, or translates the image of the mixed reality space displayed on the display screen of the display unit 536 in accordance with the user's manipulation for magnifying, reducing, or translating the image of the mixed reality space (e.g., a drag manipulation, a zoom-in/zoom-out manipulation, or the like on the screen of the display unit 536).

<Step S964>

The generation unit 535 displays the image of the mixed reality space on the display unit 536. In step S964 that immediately succeeds transition to the VR mode, the image (still image) of the mixed reality space that the image reception unit 534 received from the HMD immediately before transition to the VR mode is displayed on the display unit 536.

<Step S965>

The acquisition unit 538 acquires a position that has been designated (e.g., tapped) by the user on the display screen of the display unit 536.

<Step S966>

The transmission unit 539 transmits the designated position that was acquired by the acquisition unit 538 in step S965 to the scene data management server 130.

<Step S911>

The reception unit 513 receives the designated position that was transmitted from the transmission unit 539 in step S966.

<Step S912>

Figure 4:
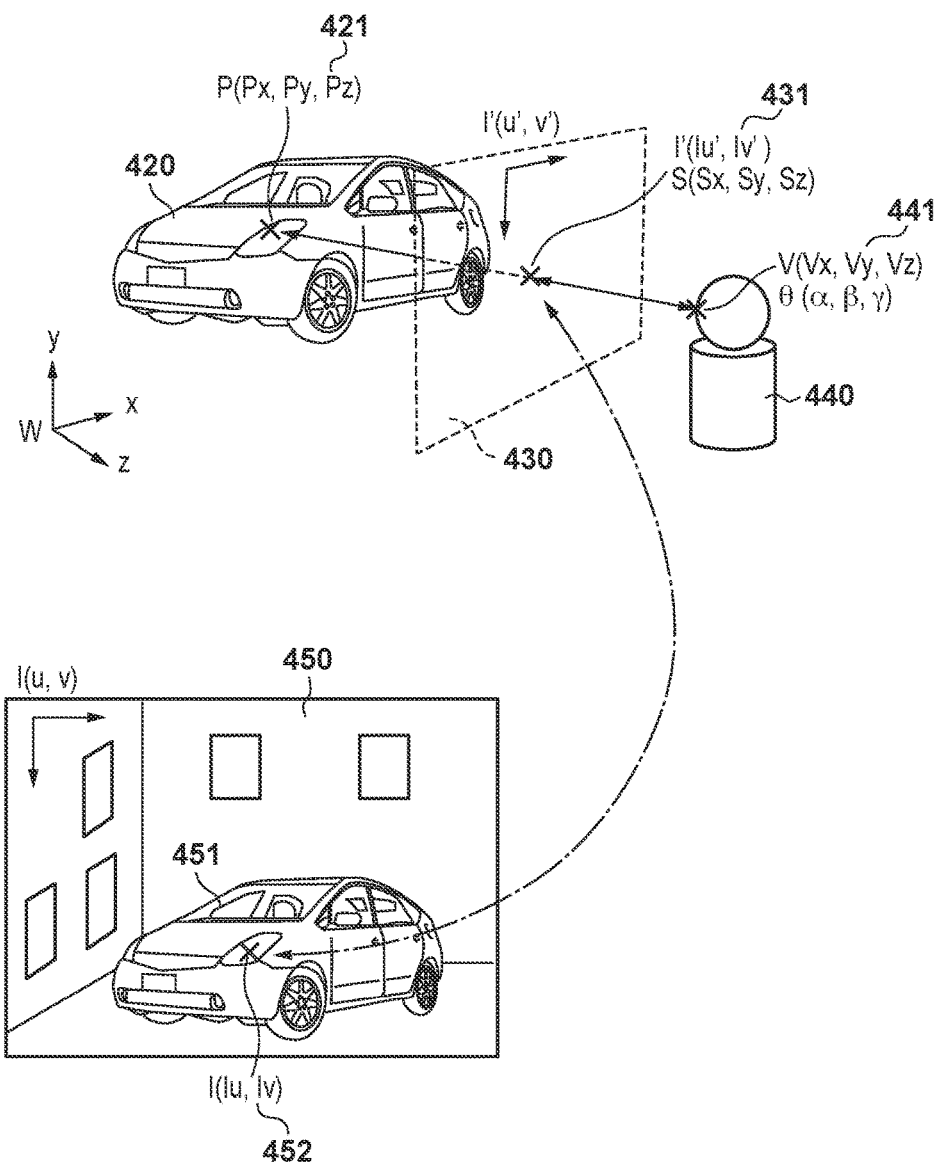
FIG. 4 illustrates processing of step S912.

A specification unit 817 specifies a virtual component (constituting the virtual object) displayed at the designated position that the reception unit 513 received in step S911. Processing for such specification is not limited to a particular method, and may be selected from among various types of conceivable processing. FIG. 4 shows one example of such conceivable processing.

For example, assume that a user has tapped a headlight of a virtual object 451 on a screen 450 of a tablet terminal device to designate the headlight, and a tapped position 452 is I (Iu, Iv). This position 452 is based on a coordinate system I (u, v) in which the position of the upper left corner of the screen 450 serves as the origin (0, 0), and a u-axis and a v-axis are defined along a horizontal direction and a vertical direction, respectively.

Next, a position 431 corresponding to the position 452 is obtained on a virtual screen 430 provided as a plane which is distanced from a position V (Vx, Vy, Vz) of a viewpoint 441 of an HMD worn on the head of a user 440 by a prescribed distance in a line-of-sight direction $\theta$ ($\alpha, \beta, \gamma$) of the viewpoint 441, and on which the line-of-sight direction serves as a normal direction. Here, the position V (Vx, Vy, Vz) indicates the x-, y-, and z-coordinates in the world coordinate system, and the line-of-sight direction $\theta$ ($\alpha, \beta, \gamma$) indicates angles of rotation about the x-, y-, and z-axes. Note that the viewpoint direction can be expressed using other methods.

The position and orientation of the virtual screen 430 in the world coordinate system can be obtained from the position and orientation V, $\theta$ of the viewpoint 441. The size (width and height) of the virtual screen 430 and the above-referenced "prescribed distance" are set based on the size of an image captured by the image sensing unit 522 and the screen size, viewing angle, and the like of the display unit 536.

Assume a case in which the image of the mixed reality space displayed on the screen 450 of the tablet terminal device is not magnified, reduced, or translated (e.g., immediately after switching to the VR mode); in this case, for example, provided that the vertical and horizontal size of the virtual screen 430 is H×W (pixels) and the vertical and horizontal size of the screen 450 is h×w (pixels), the position 431 I' (Iu', Iv') corresponding to the position 452 I (Iu, Iv) on the screen 450 can be uniquely specified as Iv'=H/h×Iv and Iu'=W/w×Iu. Here, the position 431 I' (Iu', Iv') is based on a virtual screen coordinate system (a coordinate system I' (u', v') in which the position of the upper left corner of the virtual screen 430 serves as the origin (0, 0), and a u'-axis and a v'-axis are defined along a horizontal direction and a vertical direction, respectively).

On the other hand, if the image of the mixed reality space displayed on the screen 450 of the tablet terminal device has been magnified, reduced, or translated, the screen 450 displays an image within a window on the virtual screen 430, specifically, a window that has a size corresponding to the magnification/reduction or has been translated through the translation manipulation (in practice, an image of a physical space is superimposed over that image), and hence an in-window position corresponding to the position 452 can be specified in the above-described manner.

The position 431 (x, y) can be obtained based on the following expressions provided that, for example, the vertical and horizontal size of the virtual screen 430 is H×W (pixels), the vertical and horizontal size of the screen 450 is h×w (pixels), the rate of magnification/reduction (magnification/reduction rate) applied to the original image of the mixed reality space on the screen 450 (the image of the mixed reality space displayed on the screen 450 upon transition to the VR mode) is R (where 0<R), the position of the upper left corner of the window on the virtual screen 430 is (a, b), and the position 452 on the screen 450 is (p, q).

$$x=a+W\times p/(w\times R)$$

$$y=b+H\times q/(h\times R)$$

As described above, even if the magnification, reduction, or translation manipulation has been applied to the image of the mixed reality space, the position 431 on the virtual screen 430 corresponding to the position 452 can be uniquely obtained because positions on the virtual screen 430 are in one-to-one correspondence with positions on the screen 450 of the tablet terminal device. That is to say, in the virtual screen coordinate system, the two-dimensional coordinates I' (Iu', Iv') of the position 431 corresponding to the position 452 can be uniquely obtained.

Furthermore, as each position on the virtual screen 430 is also expressed in three-dimensional coordinates, the following specification is possible: points of intersection between a straight line passing through the three-dimensional coordinates S (Sx, Sy, Sz) of the position 431 in the world coordinate system and the position V (Vx, Vy, Vz) of the viewpoint 441 and the virtual object 420 are obtained, and the three-dimensional coordinates P (Px, Py, Pz) of a point of intersection 421 that is closest to the position V (Vx, Vy, Vz) of the viewpoint 441 among the obtained points of intersection are specified as the "position on the virtual object 420 corresponding to the position 452 designated by the user on the screen 450."

<Step S914>

The changing unit 514 processes, among the scene data 131, data of the virtual component that was specified in step S912 (specified virtual component) so that the specified virtual component is visually distinguishable from other virtual components. For example, the color of the virtual component that was specified in step S912 is changed to a color different from the colors of other virtual components so that the specified virtual component is highlighted.

<Step S915>

The sharing unit 515 transmits the scene data 131 to the HMD 150/160.

Modification Example

In the second embodiment, the display unit 536 displays one still image (image of the mixed reality space) that the image reception unit 534 received from an HMD immediately before transition to the VR mode; alternatively, the display unit 536 may display a plurality of still images (images of the mixed reality space) that the image reception unit 534 received from the HMD between the time that is a prescribed period before the time of transition to the VR mode and the time of transition (or between the time that is the prescribed period before the time of transition and the time that is the prescribed period after the time of transition), or may display a still image that has been selected by the user from among the plurality of still images using the input unit 537.

Third Embodiment

Figure 10:
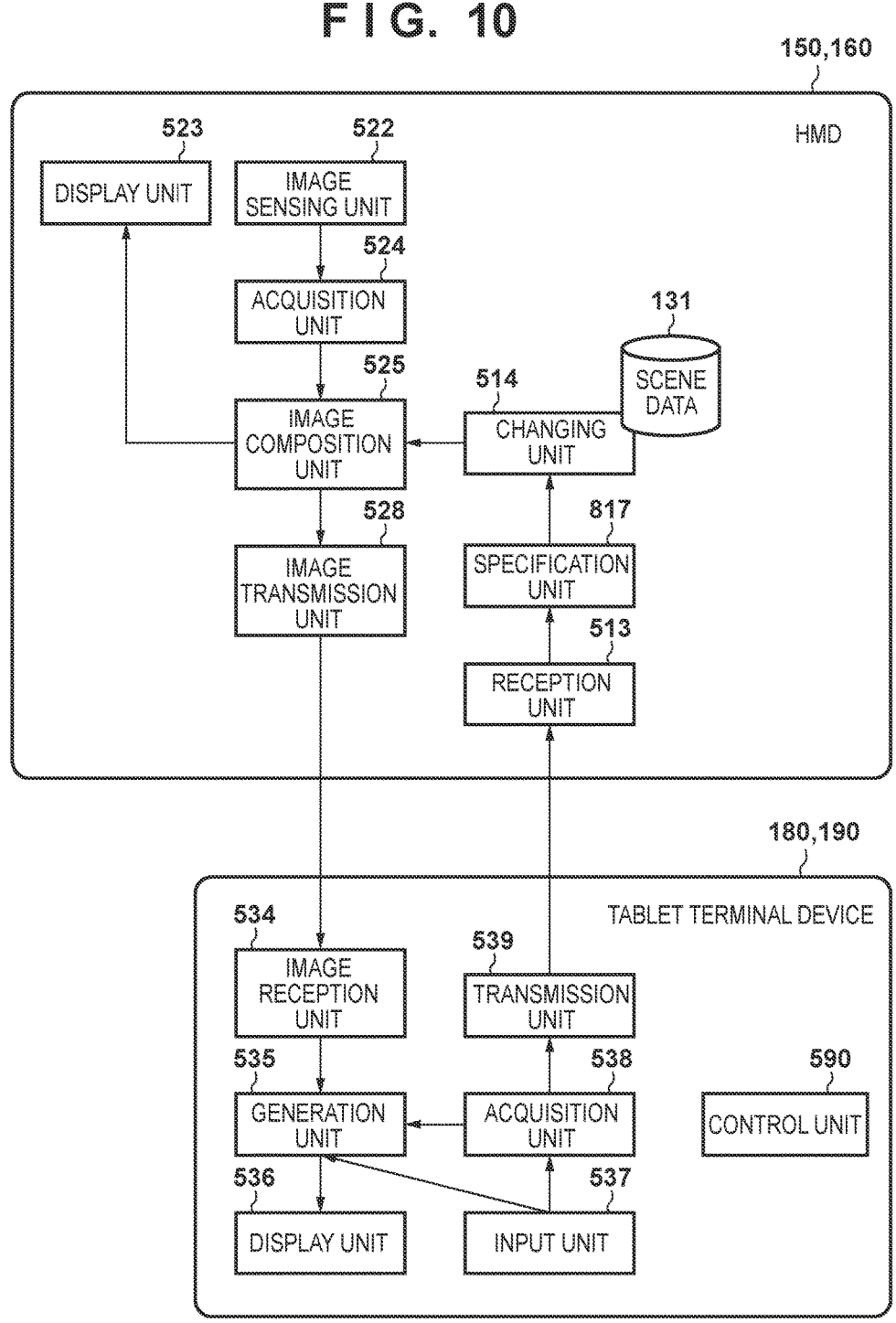
FIG. 10 is a block diagram of an exemplary functional configuration of a system according to a third embodiment.

As described in the first embodiment, several devices may be integrated. For example, as shown in FIG. 10, the HMD 150/160 and the scene data management server 130 may be integrated into one HMD 150/160. It goes without saying that the configuration of the HMD 150/160 shown in FIG. 10 may be integrated with the configuration of the HMD control device 110/120. This has already been mentioned in the first embodiment.

Fourth Embodiment

Figure 11A:
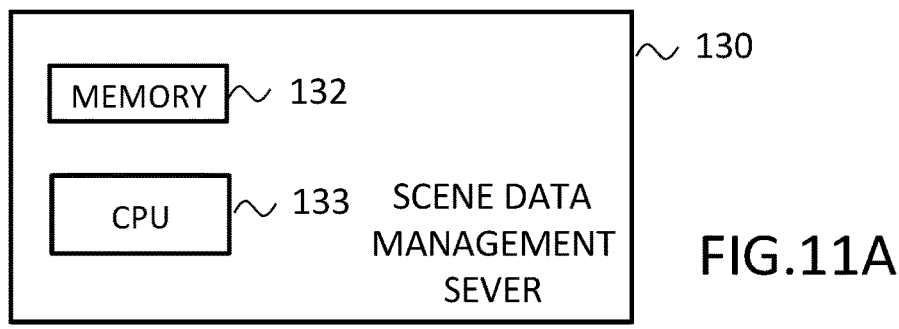
FIGS. 11A to 11C are block diagrams of an exemplary hardware configuration of a system according to a fourth embodiment.
Figure 11B:
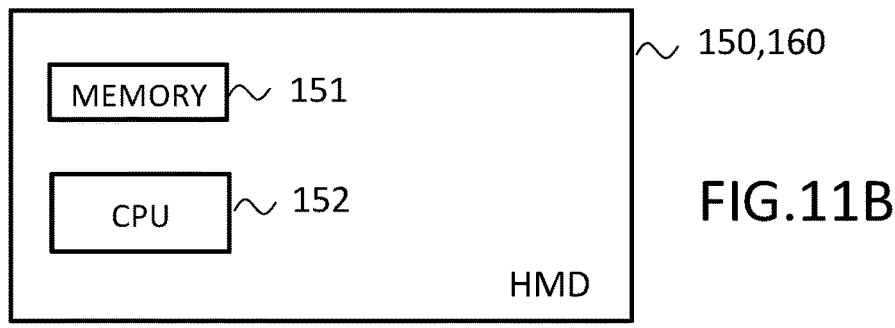
Figure 11C:
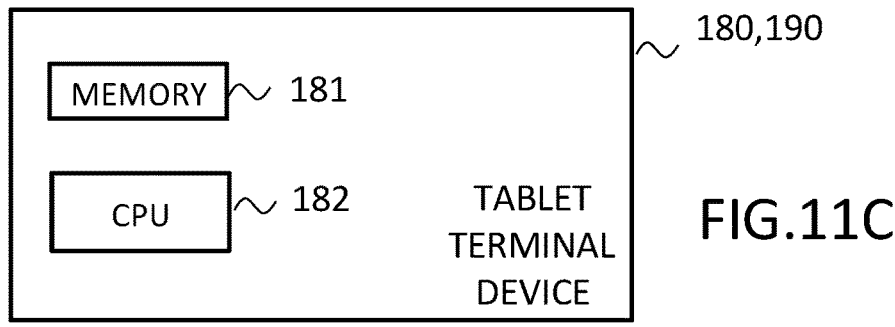

The functional units shown in FIGS. 5, 8, and 10 may be entirely constituted by hardware, or may be partially constituted by software. FIGS. 11A to 11C are block diagrams of an exemplary hardware configuration of a system according to a fourth embodiment. For example, in the case of the scene data management server 130 shown in FIG. 5, the reception unit 513, the sharing unit 515, and the changing unit 514 (as well as the specification unit 817 in the case of FIG. 8) may be implemented as a computer program. In this case, as shown in FIG. 11A this computer program is stored in a memory 132 of the scene data management server 130, and a CPU 133 of the scene data management server 130 executes this computer program. Similarly, for example, in the case of the HMD 150/160 shown in FIG. 5, the acquisition unit 526, the acquisition unit 524, the image compositing unit 525, and the image transmission unit 528 may be implemented as a computer program. In this case, as shown in FIG. 11B, this computer program is stored in a memory 151 of the HMD 150/160, and a CPU 152 of the HMD 150/160 executes this computer program. Similarly, for example, in the case of the tablet terminal device 180/190 shown in FIG. 5, the image reception unit 534, the generation unit 535, the acquisition unit 538, the transmission unit 539, and the acquisition unit 532 may be implemented as a computer program. In this case, as shown in FIG. 11C, this computer program is stored in a memory 181 of the tablet terminal device 180/190, and a CPU 182 of the tablet terminal device 180/190 executes this computer program.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-112403, filed Jun. 2, 2015, which is hereby incorporated by reference herein in its entirety.

What is claimed is:

1. An information processing apparatus connected to a first display device and a second display device, the information processing apparatus comprising:
at least one processor configured to implement instructions stored in a memory to execute a plurality of tasks including:
a first generation task that generates an image of a virtual object in accordance with a position and an orientation of the first display device;
a first display control task that:
in a case where an operation mode is set to a first mode, causes the first display device and the second display device to display a common image of the virtual object generated by the first generation task; and
in a case where the operation mode has been switched from the first mode to a second mode different from the first mode, causes the second display device to display a still image of the virtual object in accordance with the position and the orientation of the first display device immediately before the operation mode was switched from the first mode to the second mode;
a changing task that changes, in the second mode, a position and an orientation of a viewpoint for the second display device in response to an instruction input by a user observing the second display device;
a second generation task that generates, in the second mode, a still image of the virtual object in accordance with the position and the orientation of the viewpoint changed by the changing task;
a second display control task that causes, in the second mode, the second display device to display the still image of the virtual object generated by the second generation task;
a selection task that selects a portion of the virtual object in the still image displayed by the second display device in the second mode based on an instruction input by the user observing the second display device during display of the still image of the virtual object in the second mode; and
an updating task that updates the still image of the virtual object displayed by the second display device in the second mode with an image corresponding to the selected portion of the virtual object.

2. The information processing apparatus according to claim 1, wherein the first display device is worn on a head of a user observing the first display device.

3. The information processing apparatus according to claim 1, wherein the first display device includes an image sensing unit comprising a camera.

4. The information processing apparatus according to claim 3, wherein the plurality of tasks further include:
a compositing task that generates a composite image by compositing an image captured by the image sensing unit with an image of the virtual object,
wherein, in a case where the operation mode is set to the first mode, the first display control task causes the first display device and the second display device to display the composite image as the common image.

5. The information processing apparatus according to claim 1, wherein the instruction by the user is input through a manipulation involving a contact on a display screen of the second display device.

6. The information processing apparatus according to claim 1, wherein, in a case where the operation mode is set to the second mode, the display control task causes the first display device to display an image of the virtual object based on a change in a position and an orientation of the first display device.

7. The information processing apparatus according to claim 1, further comprising:
an input interface configured to accept the instruction by the user observing the second display device while the operation mode set to the second mode, the instruction being directed to at least one instruction among magnification, reduction, rotation, and translation instructions,
wherein the selection task receives the instruction input by the user via the input interface.

8. The information processing apparatus according to claim 1, wherein the selection task specifies, from the virtual object, using the position and the orientation of the first display device and a designated position based on the instruction input by the user, a portion corresponding to the designated position.

9. The information processing apparatus according to claim 1, wherein the updating task updates the still image of the virtual object so that the selected portion of the virtual object is highlighted.

10. The information processing apparatus according to claim 1, further comprising:
an input interface configured to accept, from the user observing the second display device, an update instruction for updating the position and the orientation of the viewpoint while the operation mode is set to the second mode,
wherein the second display control task causes the second display device to display the image of the virtual object from the viewpoint changed by the changing task.

11. An information processing method performed by an information processing apparatus connected to a first display device and a second display device, the information processing method being executed by at least one processor and comprising:
a first generating step of generating an image of a virtual object in accordance with a position and an orientation of the first display device;
a first display controlling step of controlling at least one of the first or second display to:
in a case where an operation mode is set to a first mode, cause the first display device and the second display device to display a common image of the virtual object generated in the first generating step;
in a case where the operation mode has been switched from the first mode to a second mode different from the first mode, cause the second display device to display a still image of the virtual object in accordance with the position and the orientation of the first display device immediately before the operation mode was switched from the first mode to the second mode;
a changing step of changing, in the second mode, a position and an orientation of a viewpoint for the second display device in response to an instruction input by a user observing the second display device;
a second generating step of generating, in the second mode, a still image of the virtual object in accordance with the position and the orientation of the viewpoint changed by the changing step;
a second display controlling step of causing, in the second mode, the second display device to display the still image of the virtual object generated by the second generating step;
a selecting step of selecting a portion of the virtual object in the still image displayed by the second display device in the second mode based on an instruction input by the user observing the second display device during display of the still image of the virtual object in the second mode; and
an updating step of updating the still image of the virtual object displayed by the second display device in the second mode with an image corresponding to the selected portion of the virtual object.

12. A non-transitory computer-readable storage medium storing a computer program executable by a computer connected to a first display device and a second display device to execute a method comprising:
a first generating step of generating an image of a virtual object in accordance with a position and an orientation of the first display device;
a first display controlling step of controlling at least one of the first or second display to:
in a case where an operation mode is set to a first mode, cause the first display device and the second display device to display a common image of the virtual object generated in the first generating step;
in a case where the operation mode has been switched from the first mode to a second mode different from the first mode, cause the second display device to display a still image of the virtual object in accordance with the position and the orientation of the first display device immediately before the operation mode was switched from the first mode to the second mode;
a changing step of changing, in the second mode, a position and an orientation of a viewpoint for the second display device in response to an instruction input by a user observing the second display device;
a second generating step of generating, in the second mode, a still image of the virtual object in accordance with the position and the orientation of the viewpoint changed by the changing step;
a second display controlling step of causing, in the second mode, the second display device to display the still image of the virtual object generated by the second generating step;
a selecting step of selecting a portion of the virtual object in the still image displayed by the second display device in the second mode based on an instruction input by the user observing the second display device during display of the still image of the virtual object in the second mode; and
an updating step of updating the still image of the virtual object displayed by the second display device in the second mode with an image corresponding to the selected portion of the virtual object.

13. A system comprising:
a first display device;
a second display device; and
an information processing apparatus connected to the first display device and the second display device,
wherein the information processing apparatus includes:
at least one processor configured to implement instructions stored in a memory to execute a plurality of tasks, including:
a first generation task that generates an image of a virtual object in accordance with a position and an orientation of the first display device;
a first display control task that:
in a case where an operation mode is set to a first mode, causes the first display device and the second display device to display a common image of the virtual object generated by the first generation task; and
in a case where the operation mode has been switched from the first mode to a second mode different from the first mode, causes the second display device to display a still image of the virtual object in accordance with the position and the orientation of the first display device immediately before the operation mode was switched from the first mode to the second mode;
a changing task that changes, in the second mode, a position and an orientation of a viewpoint for the second display device in response to an instruction input by a user observing the second display device;
a second generation task that generates, in the second mode, a still image of the virtual object in accordance with the position and the orientation of the viewpoint changed by the changing task;

- a second display control task that causes, in the second mode, the second display device to display the still image of the virtual object generated by the second generation task:
- a selection task that selects a portion of the virtual object in the still image displayed by the second display device in the second mode based on an instruction input by the user observing the second display device during display of the still image of the virtual object in the second mode; and
- an updating task that updates the still image of the virtual object displayed by the second display device in the second mode with an image corresponding to the selected portion of the virtual object.

* * * * *